United States Patent [19]

Saito et al.

[11] Patent Number: 5,485,232
[45] Date of Patent: Jan. 16, 1996

[54] DIGITAL AUDIO SIGNAL RECORDING DEVICE FOR MOTION PICTURE FILM AND AUDIO SIGNAL RECORDING SYSTEM FOR MOTION PICTURE FILM EMPLOYING THE DIGITAL AUDIO SIGNAL RECORDING DEVICE

[75] Inventors: Etsuro Saito, Kanagawa; Yoshio Ozaki, Tokyo; Toshiyuki Shirasu; Koichi Yoshikawa, both of Kanagawa, all of Japan

[73] Assignee: Sony Corporation, Tokyo, Japan

[21] Appl. No.: 226,846

[22] Filed: Apr. 13, 1994

[30] Foreign Application Priority Data

Apr. 16, 1993 [JP] Japan .................................. 5-090223

[51] Int. Cl.⁶ .................................................. G03B 31/00
[52] U.S. Cl. .................... 352/5; 352/20; 352/10; 352/37; 352/26
[58] Field of Search ............................ 352/26, 10, 20, 352/5, 37

[56] References Cited

U.S. PATENT DOCUMENTS

| | | |
|---|---|---|
| 2,479,868 | 4/1947 | Rossmann et al. . |
| 3,932,032 | 1/1976 | Weinstein . |
| 4,245,897 | 1/1981 | Beauviala et al. . |
| 4,600,280 | 7/1986 | Clark . |

Primary Examiner—Michael L. Gellner
Assistant Examiner—Matthew Miller
Attorney, Agent, or Firm—William S. Frommer; Alvin Sinderbrand

[57] ABSTRACT

A digital audio signal recording device which, in conjunction with a film magazine loaded with a motion picture film and an analog audio recording device recording analog audio signals on the motion picture film, constitutes an audio signal recording system for the motion picture film capable of recording both analog audio signals and digital audio signals on the motion picture film delivered from the film magazine. The digital audio signal recording device transports the motion picture film, delivered from the inside of the film magazine via the film reel-out section, into the digital audio signal recording device via a first film feed-in section, and then transports the film to the analog audio signal recording device via a first feed-out section and a film lead-in section. The motion picture film introduced into the analog audio signal recording device is returned into the digital audio signal recording device via a film lead-out section and a second film feed-in section. The digital audio signals are recorded in the digital sound track area on the motion picture film returned back into the digital audio signal recording device by a digital audio signal recording section provided in the digital audio signal recording device. The motion picture film, on which the digital audio signals have now been recorded, is delivered via a second film feed-out section towards the film magazine so as to be taken up in the film magazine by a film taker-in section.

7 Claims, 6 Drawing Sheets

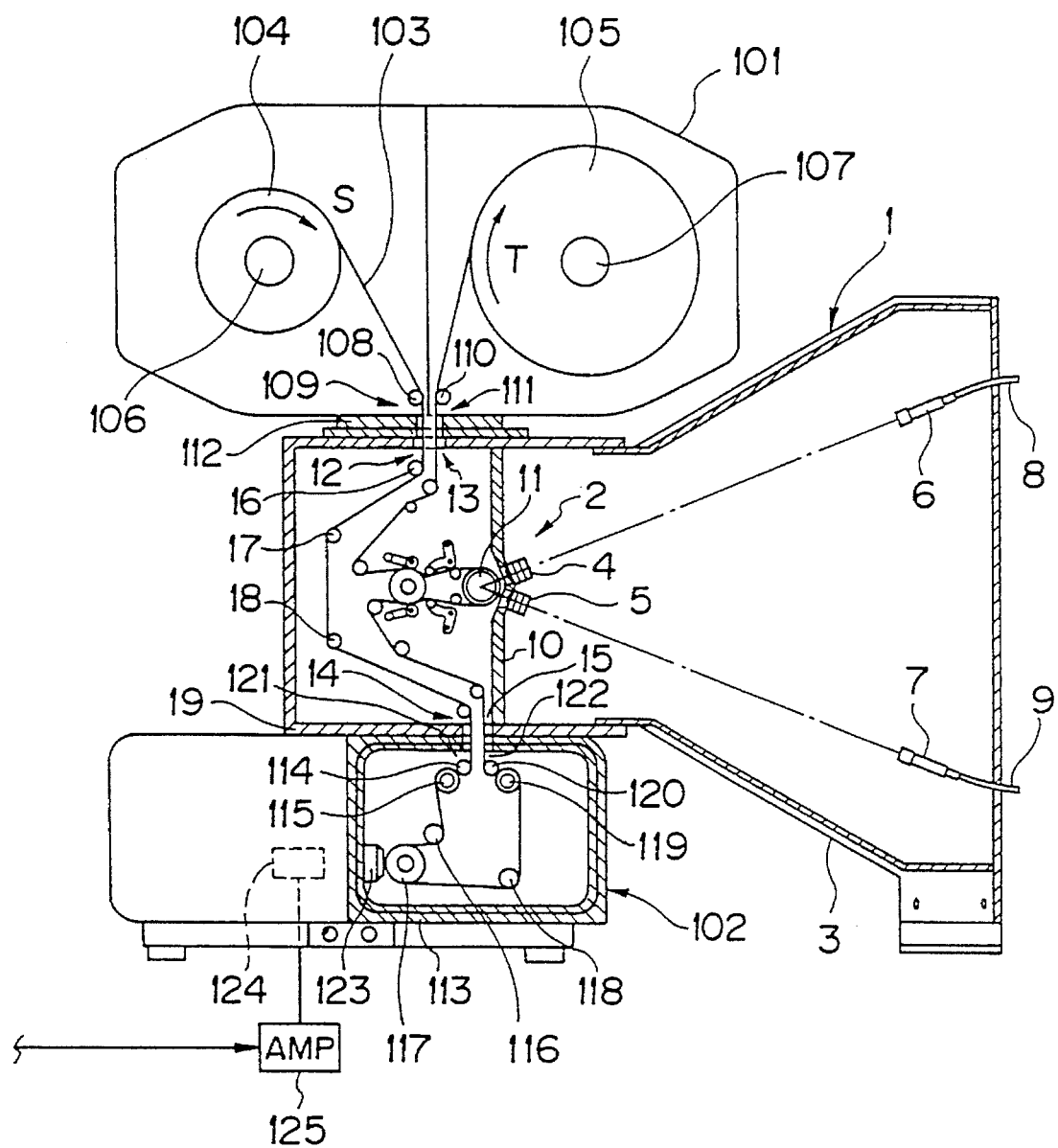
F I G . 1

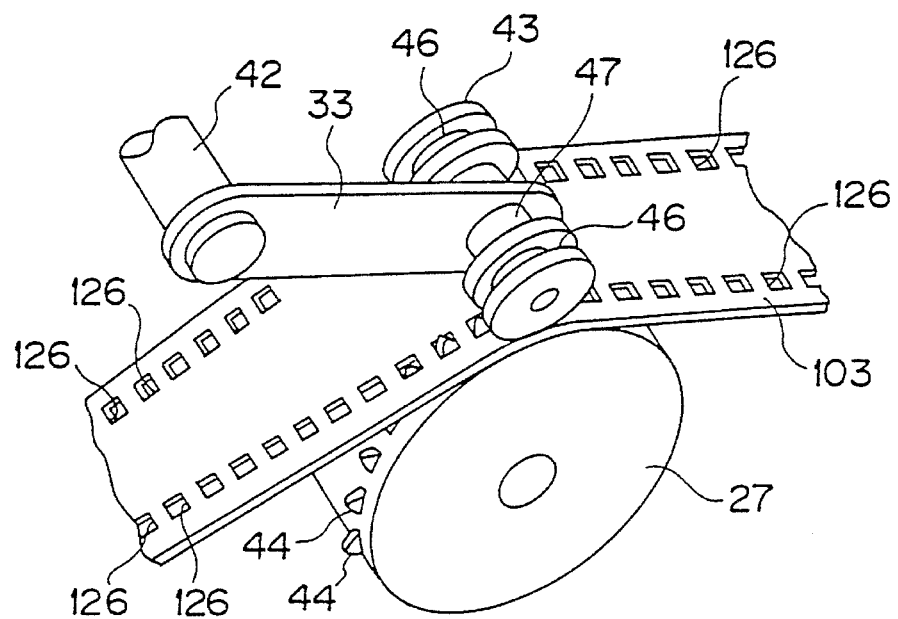
F I G. 5
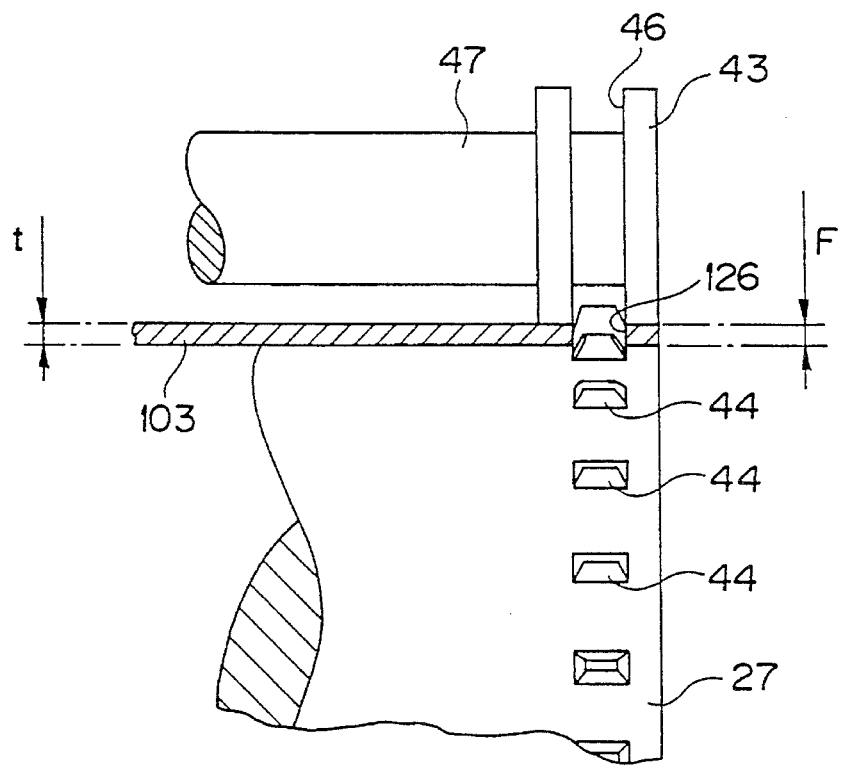
F I G. 6

DIGITAL AUDIO SIGNAL RECORDING DEVICE FOR MOTION PICTURE FILM AND AUDIO SIGNAL RECORDING SYSTEM FOR MOTION PICTURE FILM EMPLOYING THE DIGITAL AUDIO SIGNAL RECORDING DEVICE

BACKGROUND OF THE INVENTION

1. Field of the Invention

This invention relates to a digital audio signal recording unit for recording digital audio signals on a sound track on a motion picture film for forming a digital sound track, and an audio signal recording system in which the digital audio recording unit is combined with an analog audio signal recording unit for recording analog audio signals on the motion picture film for forming an analog sound track in such a manner that the digital sound track having the digital audio signals recorded thereon and the analog sound track having the analog audio signals recorded thereon may be simultaneously formed on one and the same motion picture film. More particularly, it relates to a digital audio signal recording unit combined with an analog audio signal recording unit in such a manner that both the analog audio signals and the digital audio signals may be recorded during travel of the motion picture film from a film supply side to a film take-up side.

2. Description of the Related Art

The motion picture film is constituted by an area in which the pictures have been recorded and an area in which the audio signals have been recorded. The pictures are discretely recorded in a series of frames provided at the center along the length of the motion picture film. The audio signals are usually recorded on the motion picture film in the form of analog signals. The audio signals, recorded in the state of analog signals on the motion picture film, are recorded in an analog sound track area provided between the frames dedicated to the pictures and a series of perforations formed on both longitudinal edges of the motion picture frame and adapted for being engaged by a feed mechanism used for feeding the motion picture film.

There is also proposed a motion picture film in which analog audio signals are recorded after modulation into digital audio signals. The digital audio signals may be recorded on the motion picture film without being adulterated with noise components and are not susceptible to deterioration in the playback audio signals even on repeated reproduction of the motion picture film. Sound reproduction of extremely high quality may be achieved by employing digital audio signals as the audio signals recorded on the motion picture film.

If the digital audio signals are recorded on the motion picture film in substitution for analog audio signals, the digital signals are recorded in the analog sound track area in which the analog audio signals are conventionally recorded.

Some of the projectors used for replaying the motion picture film are capable of replaying only the motion picture film carrying the analog audio signals, while being incapable of replaying the motion picture film carrying digital audio signals. Consequently, the motion picture film carrying digital audio signals also has analog audio signals recorded thereon so that it may be reproduced by a projector designed to replay only the motion picture film carrying the analog audio signals. When recording the digital audio signals along with the analog audio signals, the digital audio signals are recorded in areas outside of the rows of perforations formed along both longitudinal edges of the film, areas between the perforations or in areas between frames dedicated to picture recording.

For recording the audio signals on the motion picture films, an audio signal recording unit dedicated to a motion picture film adapted to record only the audio signals is employed. There has been proposed an audio signal recording unit of this type which is capable of recording both the analog audio signals and the digital audio signals. When recording both the analog and digital audio signals by such recording unit, the analog audio signals are first recorded as the film is run in one direction. The film, now having the analog audio signals recorded thereon, is then rewound and again run in the one direction and the digital audio signals are recorded on the running film. Consequently, should the analog and digital audio signals be recorded using the audio signal recording unit, an operation of rewinding the elongated motion picture film is necessitated, thus complicating the process of forming the analog and digital sound tracks. In addition, the mechanism of running the motion picture film is also complicated, while the overall recording unit becomes bulky in size.

Furthermore, the audio signal recording unit capable of recording both the analog audio signals and digital audio signals has to be employed in place of an audio signal recording unit capable of recording only the analog audio signals. Thus there is no necessity of providing the audio signal recording unit for the motion picture film capable of recording only the analog audio signals.

OBJECTS OF THE INVENTION

It is an object of the present invention to provide a digital audio signal recording unit for a motion picture film which may be used in conjunction with the conventional audio recording unit capable of recording only the analog audio signals so that the digital audio signals may be recorded along with the analog audio signals.

It is another object of the present invention to provide a digital audio signal recording unit for the motion picture film, whereby the digital audio signals may be recorded on the same motion picture film in addition to the analog audio signals by a simplified operation.

It is a further object of the present invention to provide a digital audio signal recording unit for the motion picture film which is small-sized and simplified in structure.

It is yet another object of the present invention to provide a novel audio signal recording system for a motion picture film in which the digital audio signal recording unit described above is combined with an audio recording unit for a motion picture film capable of recording only the analog audio signals in such a manner that the digital audio signals may be recorded along with the analog audio signals.

SUMMARY OF THE INVENTION

The digital audio signal recording device for a motion picture film according to the present invention comprises a first film feed-in section provided at a position in register with a film feed-out section adapted for feeding out the motion picture film loaded in the film magazine, a digital audio signal recording section for recording the digital audio signals in digital sound track areas on the motion picture film, a first film feed-out section provided at a position in register with a film lead-in portion of an analog audio signal recording unit adapted for recording analog audio signals in an analog sound track area on the motion picture film, a second film feed-in section provided in register with a film lead-out section of the analog audio signal recording unit, and a second film feed-out section provided at a position in register with a film taker-in section re-introducing the motion picture film into the film magazine.

The digital audio signal recording unit is provided between the film magazine having the motion picture film loaded thereon and the analog audio signal recording unit for constituting an audio signal recording system for the motion picture film capable of recording both the analog audio signals and the digital audio signals on the motion picture film reeled out from the film magazine.

With the digital audio signal recording unit for the motion picture film, the digital audio signal recording is made on the motion picture film which, reeled out from the film magazine and passed through the digital audio signal recording device, is transported to the analog audio signal recording unit for recording analog audio signals thereon and subsequently transported back to the digital audio signal recording unit.

The digital audio signal recording unit according to the present invention, recording digital audio signals on the motion picture film having analog audio signals recorded thereon by the analog audio signal recording unit, further comprises signal delay means for delaying the digital audio signals by the time required for the motion picture film to be moved from the site of recording of the analog audio signals by the analog audio signal recording device as far as the site of recording of the digital audio signals by the digital recording section and the time required for digital processing by the digital recording means.

A digital audio signal recording unit which, in conjunction with a film magazine loaded with a motion picture film and an analog audio recording unit recording analog audio signals on the motion picture film, constitutes an audio signal recording system for the motion picture film which is capable of recording both analog audio signals and digital audio signals on the motion picture film delivered from the film magazine. The digital audio signal recording unit transports the motion picture film, delivered from the inside of the film magazine via the film reel-out section, into the digital audio signal recording unit via a first film feed-in section, and then transports the film to an analog audio signal recording device via a first feed-out section and a film lead-in section. The digital audio signals are recorded in the digital sound track area on the motion picture film returned back into the digital audio signal recording unit by a digital audio signal recording section provided in the digital audio signal recording unit. The motion picture film, on which the digital audio signals have now been recorded, is delivered via a second film feed-out section towards the film magazine so as to be taken up in the film magazine by a film taker-in section.

With the digital audio signal recording unit for the motion picture film according to the present invention, in which the motion picture film delivered form the film magazine is transported to an analog audio signal recording unit adapted to record analog audio signals in the analog sound track area of the film, and in which digital audio signals are recorded in the digital sound track area of the motion picture film returned from the analog audio signal recording device, it is possible to constitute a system in which both the analog audio signals and the digital audio signals may be recorded on the motion picture film by running the motion picture film only once for all.

The film magazine and the analog audio signal recording unit, combined with the digital audio signal recording unit for constituting the audio signal recording system for the motion picture film, may be those conventionally employed for the formation of the analog sound track.

The audio signal recording system for the motion picture film, obtained by combining the digital audio signal recording unit according to the present invention with the film magazine and the analog audio signal recording device, records the digital audio signals on the motion picture film which, reeled out from the film magazine and passed through the digital audio signal recording device, reaches the analog audio signal recording unit for recording analog audio signals thereon, and is again transported to the digital audio signal recording unit. Consequently, the analog audio signals and the digital audio signals derived from the same sound source may be recorded at a position on the motion picture film associated with the same frame with a delay corresponding to the time required for digitalizing the sound source data. By delaying the digital audio signals by signal delay means by the time required for the motion picture film to be moved from the site of recording of the analog audio signals by the analog audio signal recording unit as far as the site of recording of the digital audio signals by the digital recording section and the time required for digital processing by the digital recording means, the analog audio signal and the digital audio signals derived from the same sound source may be recorded at the position in register with the same frame on the motion picture film.

BRIEF DESCRIPTION OF THE DRAWINGS

FIG. 1 is a side view showing a digital audio signal recording unit for a notion picture film, according to the present invention, with the digital audio signal recording unit being combined with a film magazine and an analog audio signal recording unit for constituting an audio signal recording system for the motion picture film, with a portion of the recording system being broken away.

FIG. 5 is an enlarged perspective view showing a film feed mechanism constituting the digital audio signal recording unit for the motion picture film according to the present invention.

FIG. 6 is an enlarged front view showing the film feed mechanism.

DETAILED DESCRIPTION OF THE PREFERRED EMBODIMENTS

Figure 3:
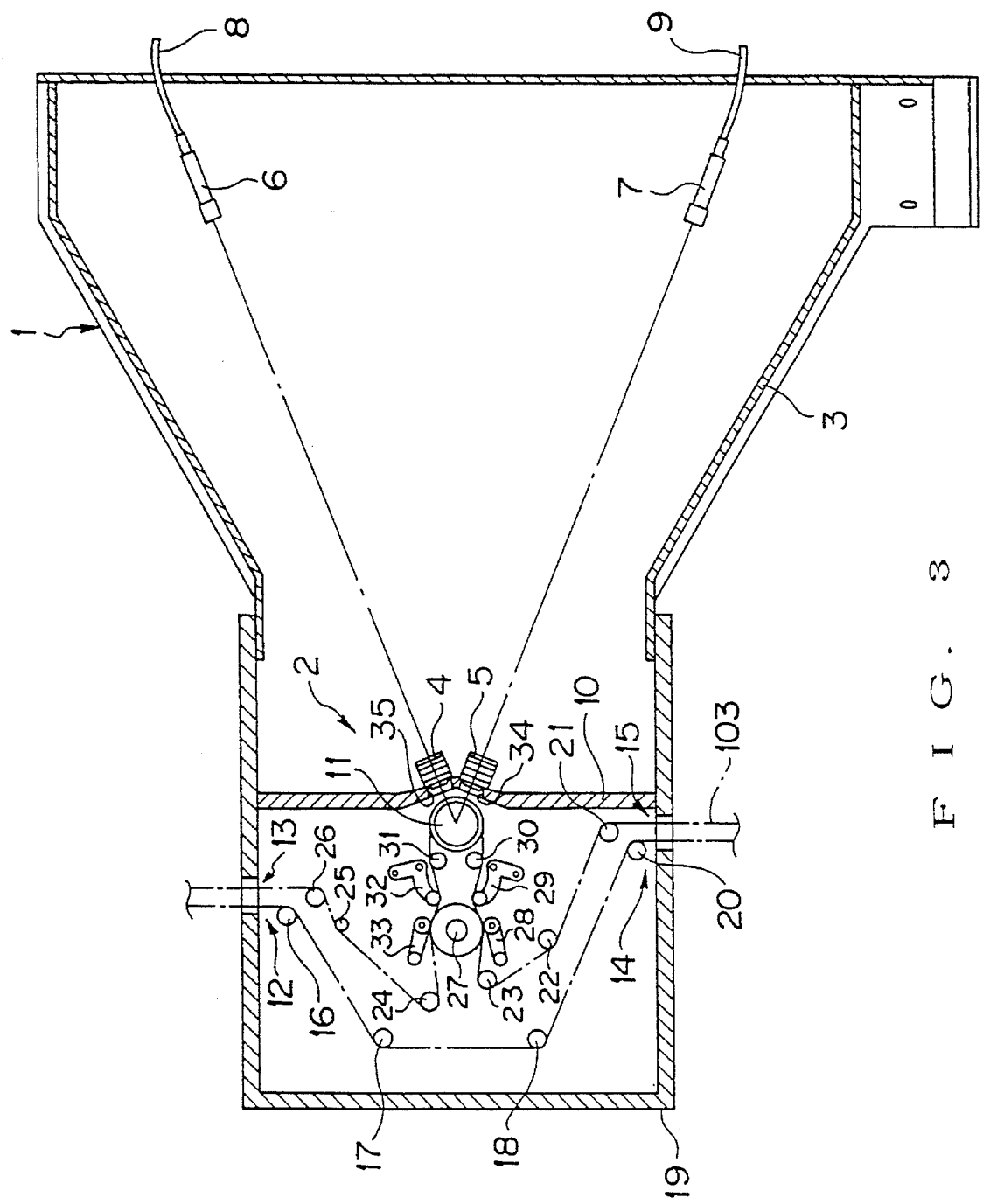
FIG. 3 is a cross-sectional side view of the digital audio signal recording unit for the motion picture film according to the present invention.

The digital audio signal recording unit for recording digital audio signals on a digital sound track area on a motion picture film for forming a digital sound track on the motion picture film is designed and constructed as shown in FIGS. 1 and 3. That is, the digital signal recording unit includes an outer casing 3 designed as a light screening casing. The inner space of the outer casing 3 is divided into a first spacing and a second spacing by a partitioning member 10 substantially in the form of a flat plate. The first spacing defined by the partitioning member 10 is the spacing within which runs a motion picture film 103. The upper surface of a main body of the recording unit, associated with the first spacing, is designed as an attachment portion on which is mounted a mounting member 112 provided on the lower part of a film magazine 101. Another mounting member 19 adapted for being mounted on an upper surface of an analog audio signal recording unit 102, is provided on the lower surface of the main body of the recording unit.

The motion picture film 103 comprises an elongated film base which is formed of a transparent material, such as transparent synthetic resin, and which is coated with a photosensitive material as an emulsifier. A series of frames 128, each carrying a still picture, are centrally arranged along the length of the film 103 by sensitizing the photosensitive material with the imaging light. On both sides of the film 103 are arrayed a large number of left and right perforations 128 for extending at an equal pitch along the longitudinal edges of the film 103.

An analog sound track area 127 is formed between the array of the frames 128 and the array of the perforations on one longitudinal edge of the motion picture film 103. Analog audio signals are recorded in the analog sound track area 127. A left channel sound track 127L and a right channel sound track 127R are formed in the analog sound track area 127 carrying the analog audio signals. In these left and right channel sound tracks 127L, 127R, there are formed wave patterns corresponding to the left and right channel analog audio signals by the photosensitizing treatment. In other words, there are formed strip-shaped photosensitized portions on the left and right channel sound tracks 127L, 127R, the widths of which are modulated by analog light modulation in accordance with analog audio signals for the left and right channels.

In addition, the motion picture film 103 has a first digital sound track area 129 and a second digital sound track area 130. These digital sound track areas 129, 130 are formed in a pair along both longitudinal edges of the motion picture film 103. That is, these digital sound track areas 129, 130 are formed on both lateral sides of the motion picture film 103 for extending on the outer sides of the rows of the perforations 126 and for being partially intruded into the space between adjacent perforations 126.

In each of the digital sound track areas 129, 130, audio signals are recorded as digitally modulated audio signals in the form of a string of small-sized dots for forming a digital sound track. Four channels of the digital audio signals for each of the digital sound tracks areas 129, 130, totalling eight channels, are formed by respective strings of small-sized dots.

The film magazine 101 is formed as a casing within which can be rotatably housed a supply film reel 104 and a take-up film reel 105 as a reel pair. These film reels 104, 105 are mounted on reel shafts 106, 107, formed as a pair within the film magazine 101, respectively, and are transversely supported so that the rotational shafts thereof run parallel to each other and the major surfaces thereof lie in one and the same plane. The supply reel film 104 carries the motion picture film 103, at least the sound track areas 127, 129 and 130 of which remain unsensitized.

In the lower surface of the film magazine 101, more precisely, in the mounting member 112, there is formed a film reel-out portion 109, in the form of a through-hole, via which the motion picture film 103 reeled out from the supply film reel 104 is led out of the supply film reel 104. The motion picture film 103, thus reeled from the supply film reel 104, is guided by a guide roll 108 arranged in the vicinity of the film reel-out portion 109 so as to be led out of the film magazine 101 via the film reel-out portion 109.

In the mounting member 112 on the lower surface of the film magazine 101, there is also formed a film taker-in portion 111, in the form of a through-hole, via which the motion picture film 103 to be taken up by the take-up film reel 105 is fed from outside of the film magazine 101 into the inside thereof. The motion picture film 103, thus introduced via the film taker-in portion 111, is guided by a guide roll 110 mounted in the vicinity of the film taker-in portion 111 so as to be taken up on the take-up film reel 105.

In the vicinity of the upper surface of a main body of the digital audio signal recording unit 1 are mounted a first film feed-in portion 12 and a second film feed-out portion 13 which are operatively linked to the film reel-out portion 109 and the film taker-in portion 111, respectively. That is, with the film magazine 101 mounted in position on the upper surface of the digital audio signal recording unit 1, the motion picture film 103, reeled out from the film magazine 101 via the film reel-out portion 109, is introduced into the inside of the digital audio signal recording unit i via the first film feed-in portion On the other hand, the .motion picture film 103, led out of the digital audio signal recording unit i via the second film feed-out portion 13, is introduced into the film magazine 101 via the film taker-in portion 111.

The analog audio signal recording unit 102 has an outer casing 113, formed as a light-screening casing, within which are mounted a light bulb 124 and a feed drum 117 rotationally driven by an electric motor, not shown. In the upper surface of the analog audio signal recording unit 102, carrying the mounting member 109 of the digital audio signal recording unit 1, there are formed side by side a film lead-in portion 121 and a film lead-out portion 122, which are through-holes via which the motion picture film 103 is led into and out of the outer casing 113 of the analog audio signal recording unit 102, respectively.

In the analog audio signal recording unit 102, the motion picture film 103, fed into the outer casing 113 via the film lead-in portion 121, is fed via a guide roll 114, a sprocket 115 and a tension regulation roll 116, in this order, so as to be placed around the feed drum 117. The motion picture film 103, fed by the feed drum 117, is fed via a tension regulation roll 118, a sprocket 119 and a guide roll 120, in this order, so as to be led out of the outer casing 113 via the film lead-out portion 122. The guide rolls 114, 120, the sprockets 115, 119, the tension regulation rolls 116 118 and the feed drum 117 are supported for rotation and have their respective rotary shafts mounted parallel to one another and to the rotary shafts of the reel shafts 106, 107.

In the vicinity of the lower surface of the main body of the digital audio signal recording unit 1 are mounted a first film feed-out portion 14 and a second film feed-in portion 13 which are operatively linked to the film lead-in portion 121 and the film lead-out portion 122, respectively. That is, with the main body of the digital audio signal recording unit 1 mounted in position on the upper surface of the analog audio signal recording unit 12, the motion picture film 103, reeled out from the film magazine 101 into the inside of the digital audio signal recording unit 1, is introduced into the inside of the analog audio signal recording unit 102 via the first film feed-out portion 14 and the film lead-in portion 121. On the other hand, the motion picture film 103, led from the analog audio signal recording unit 102 via the film lead-out portion 122 out of the outer casing 113, is introduced into the digital audio signal recording unit 1 via the second film feed-in portion 15 and thence into the film magazine 101, as described above.

In the analog audio signal recording unit 102, the light bulb 124 is mounted facing the peripheral surface of the feed drum 117 via a projection lens 123. The projection lens, having its optical axis aligned with the centerline of the feed drum 117, is mounted facing the analog track area 127 of the motion picture film 103 placed around the feed drum 117. The light bulb 124 is fed with analog audio signals via a light bulb controller (AMP) 125 and radiates a light beam having its light intensity modulated in accordance with the analog audio signals. Consequently, with the present analog audio signal recording unit 102, the analog sound track, having a portion sensitized in the form of a strip the width of which is modulated in accordance with the analog audio signals, is generated in the analog sound track area 127 of the motion picture film 103, which is fed by being placed around the feed drum 117.

On the upper surface of the analog audio signal recording unit 102, the mounting member 112 of the film magazine 101 may also be mounted, in which case the motion picture film 103 fed out of the film magazine 101 is fed into the inside of the analog audio signal recording unit 102 via the film reel-out portion 109 and the film lead-in portion 121 so as to be returned from the analog audio signal recording unit 102 via the film lead-out portion 122 and the film taker-in portion 111. At this time, only the analog sound track may be formed on the motion picture film 103.

Within the main body of the digital audio signal recording unit 1, the motion picture film 108, introduced into the outer casing 3 of the digital audio signal recording unit 1 via the first film feed-in portion 12, is guided by plural guide rolls 16, 17, 18 and 20 and arrive at the first film feed-out portion 14 via which it is delivered out of the outer casing 8. Such feed of the motion picture film 108 is by the driving force exerted by the feed drum 117 within the analog audio signal recording unit 102. The guide rolls 18, 17, 18 and 20 are supported for rotation and mounted with their rotary shafts parallel to one another and to the axes of the reel shafts 108, 107.

Within the main body of the digital audio signal recording unit 1, the motion picture film 103, introduced into the outer casing 3 of the digital audio signal recording unit 1 via the second film feed-in portion 15, is guided by plural guide rolls 21, 22, 23 and contacted with the periphery of the sprocket 27 and the guide roll 30. The film is then wound about 180' around a drum 11 of a digital recording section 2 as digital recording means and contacted with a guide roll 31. The film is then contacted again with the periphery of the sprocket 27 and guided by plural guide rolls 24, 25 and 26 to arrive at the second film feed-out portion 13. The guide rolls 21, 22, 23, 24, 25, 26, 30 and 31, sprocket 27 and the drum 11 are supported for rotation and mounted with their rotary shafts parallel to one another and to the axes of the reel shafts 108, 107.

Figure 4:
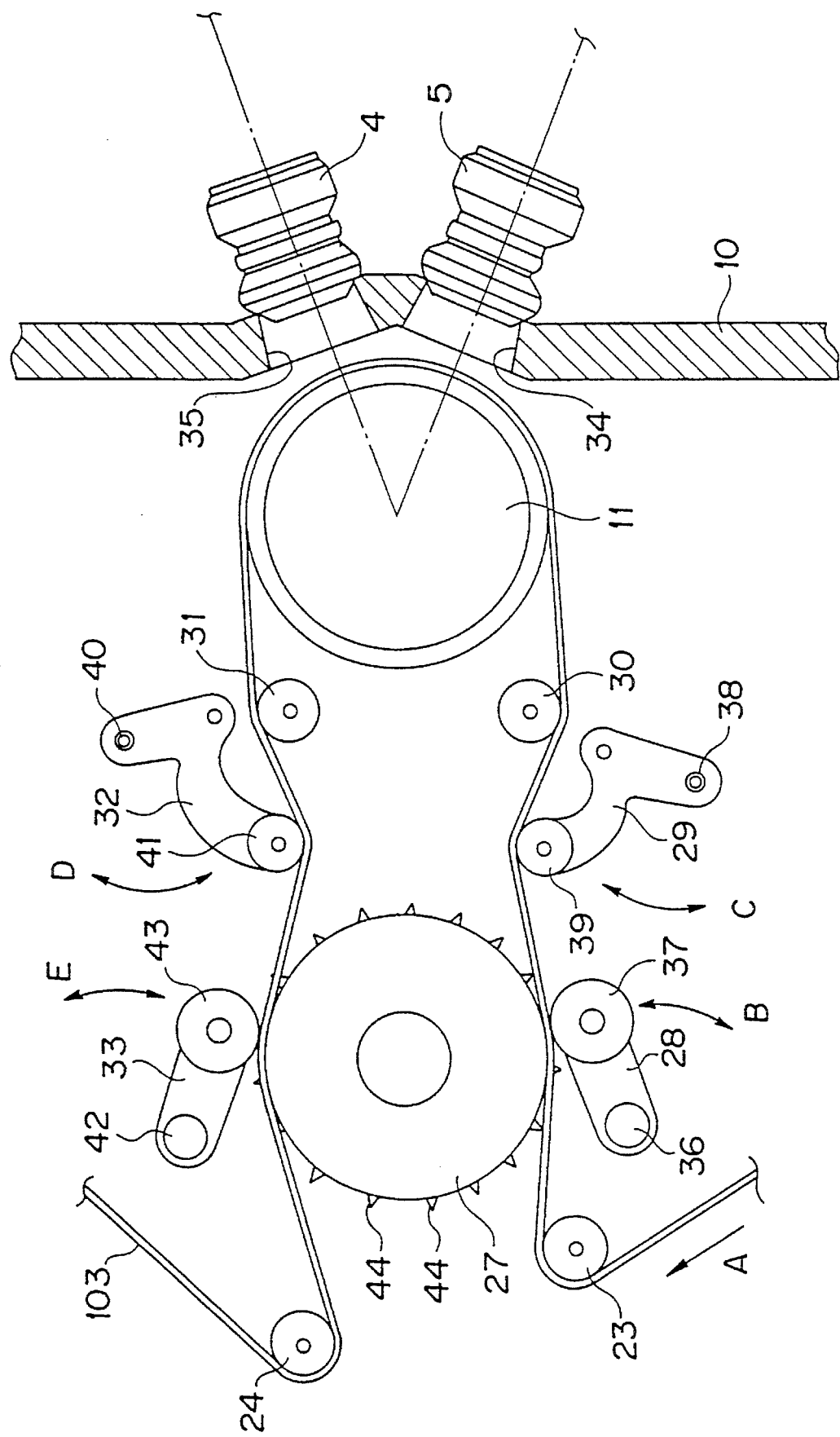
FIG. 4 is an enlarged side view showing essential portions of the digital audio signal recording unit for the motion picture film according to the present invention.
Figure 7:
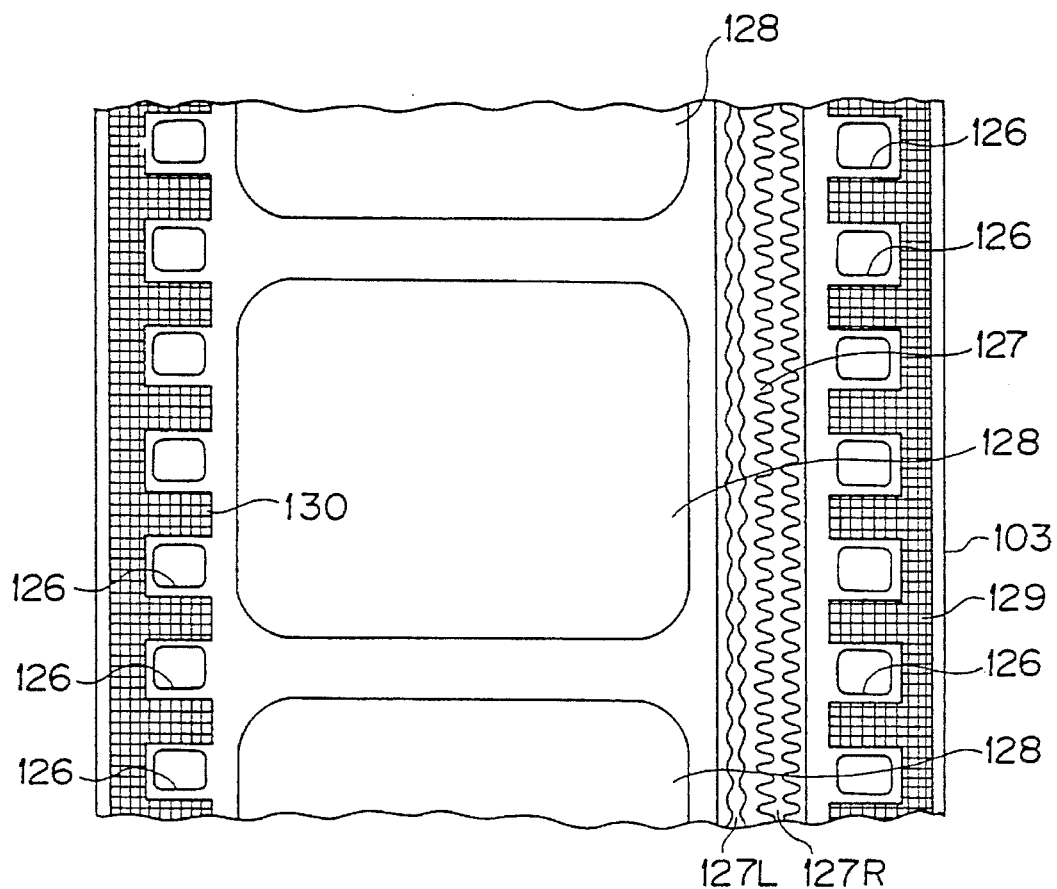
FIG. 7 is an enlarged plan view showing essential parts of an enlarged plan view showing essential portions of the motion picture film used in the audio signal recording system for the motion picture film according to the present invention.

The peripheral surface of the sprocket 27 has plural feed teeth 44, adapted for being engaged with the perforations 126, at the same pitch as that of the perforations 128, as shown in FIGS. 4 to 6.

Film retention arms 28, 33, designed as a pair, are arranged below and above the sprocket 27, respectively.

These film retention arms 28, 33 have their proximal ends rotatably supported via supporting shafts 30, 42 by the outer casing 3. Rolls 37, 43 are carried at the distal ends of the film retention arms 28, 33, respectively. These film retention arms 28, 33 are rotated in the directions shown by arrows B and E in FIG. 4 for bringing the rolls 37, 43 into and out of contact with the sprocket 27. The entire peripheral surface of each of the rolls 37, 43 has a central groove 46 having a width substantially corresponding to the width of the feed teeth 44.

When the film retention arms 28, 33 have been rotated for shifting the rolls 37, 43 towards the sprocket 27, the retention arms are positioned so that the distance between the peripheral surfaces of the rolls 37, 43 and the peripheral surface of the sprocket 27, shown by arrow F in FIG. 6, is slightly larger than the thickness of the motion picture film 103, indicated by arrow t in FIG. 6. At this time, the feed teeth 44 are intruded into the groove 46. The motion picture film 103 is clamped below the sprocket 27 between the sprocket 27 and the roll 37, while being clamped above the sprocket 27 between the sprocket 27 and the roll 43. The motion picture film 103 is fed above and below the sprocket 27, rotating the sprocket 27, by the feed teeth 44 engaged in the perforations 126.

Tension regulation arms 29, 32 are arranged between the sprocket 27 and the guide rolls 30 and 31 mounted in the vicinity of the drum 11. These tension regulation arms 29, 32 have their proximal ends rotatably supported via supporting shafts 38, 40 by the outer casing 3. Rolls 39, 41 are carried at the distal ends of the tension regulation arms 29, 32, respectively. These tension regulation arms 29, 32 are rotated in the directions shown by arrows C and D in FIG. 4 for bringing the rolls 39, 41 into and out of contact with the motion picture film 103 being fed. The tension regulation arms 29, 32 are rotationally biased by biasing means, such as springs, not shown. The tension regulation arm 29, provided below the sprocket 27, supports the motion picture film 103 by thrusting it by the roll 39 upwards, that is towards the sprocket 27 and the guide roll 30. On the other hand, the tension regulation arm 32, provided above the sprocket 27, supports the motion picture film 103 by thrusting it by the roll 41 downwards, that is towards the sprocket 27 and the guide roll 31.

The drum 11 has a suitable mass and hence certain inertia with respect to the rotation which is sufficient to stabilize the feed rate of the motion picture film 103. The drum 11 is mounted in the vicinity of the partitioning member 10.

The partitioning member 10 carries first and second projection lenses 4 and 5 forming a lens pair and making up a digital recording unit 2. The first projection lens 4 is mounted facing the periphery of the drum 11 via a through-hole 35 formed in the partitioning member 10. The first projection lens 4 is mounted with its optical axis passing through the center axis of the drum 11 and is mounted for facing the first digital sound track area 129 of the motion picture film 103 placed around the drum 11. The second projection lens 5 is mounted facing the periphery of the drum 11 via a through-hole 34 formed in the partitioning member 10. The second projection lens 5 is mounted with its optical axis passing through the center axis of the drum 11 and is mounted for facing the second digital sound track area 130 of the motion picture film 103 placed around the drum 11. The projection lenses 4 and 5 are arranged so that the optical axes thereof are rotated a pre-set angle relative to each other about the rotational axis of the drum 11 as the center of rotation.

The projection lenses 4 and 5 form images of light points emitted by a first light emitting device 8 and a second light emitting device 7 in the digital sound track areas 129, 130 of the motion picture film 103 placed around the drum 11. The light emitting devices 6 and 7 are arranged in the second spacing defined by the partitioning member 10 within the outer casing 3. The images of the light points emitted by the light emitting devices 6 and 7 and formed in the digital sound track areas 129, 130 are reduced in size so that the images of the light emitting devices 8 and 7 are accommodated within the digital sound track areas 129, 130.

Figure 2:
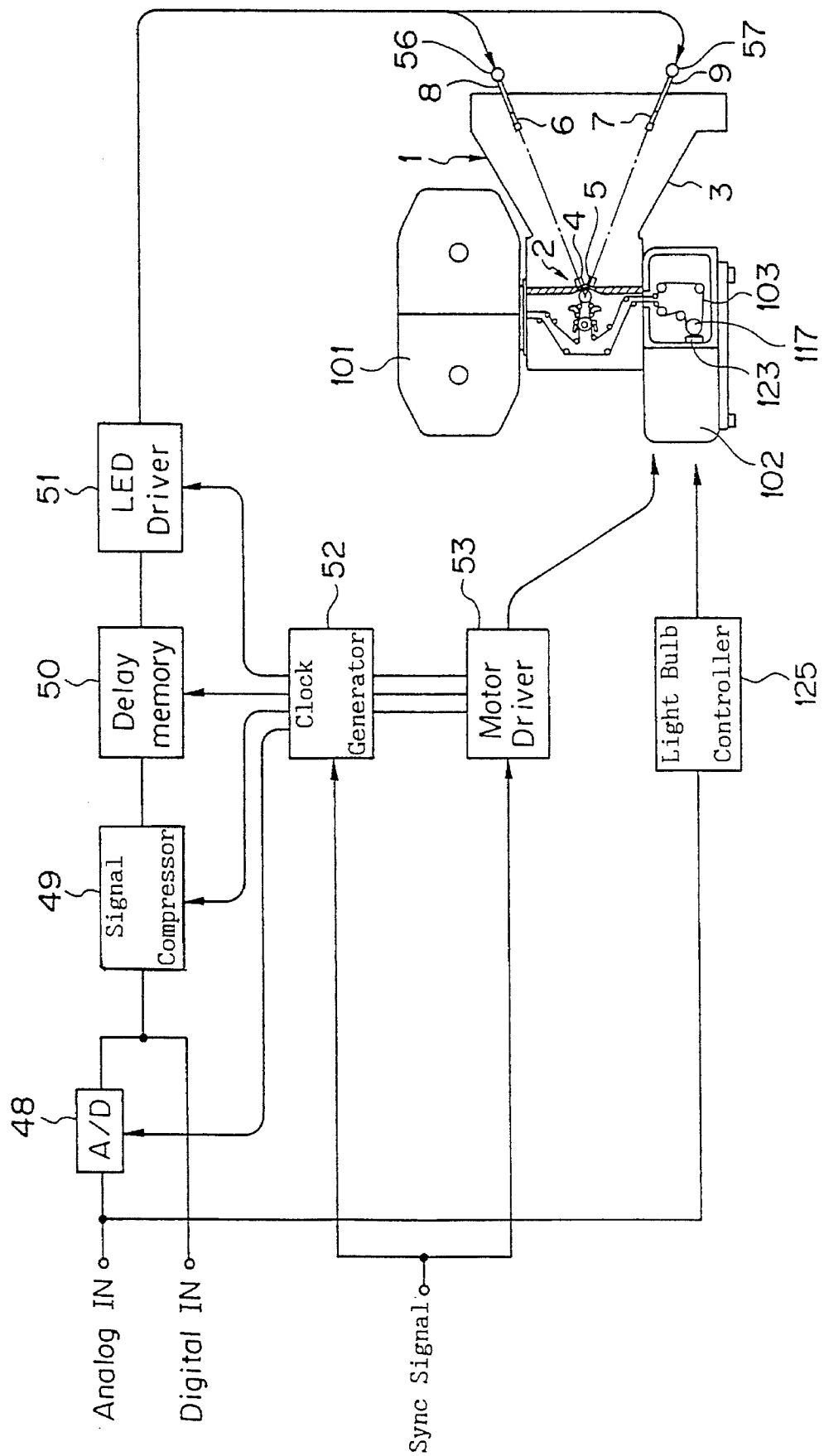
FIG. 2 is a block diagram showing an arrangement of a control circuit for driving the audio signal recording system for the motion picture film shown in FIG. 1.
Figure 8:
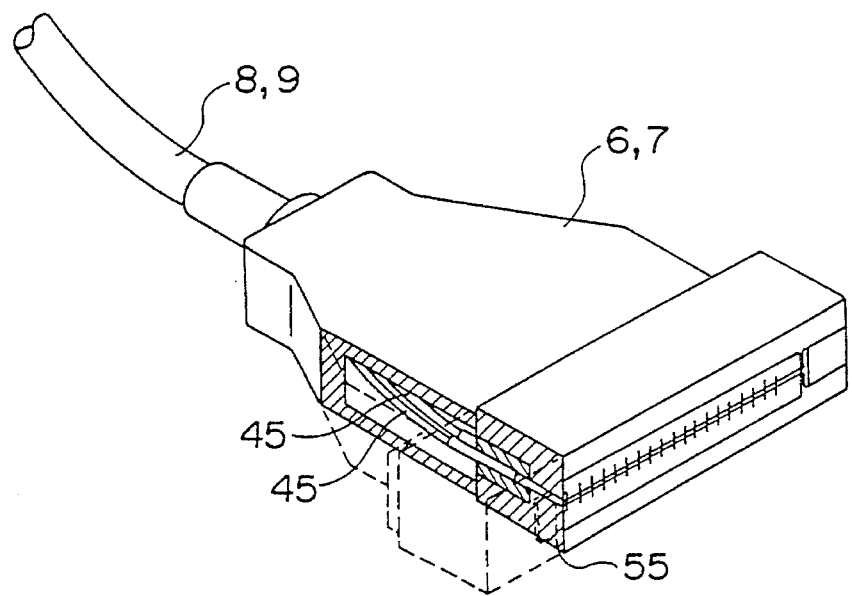
FIG. 8 is an enlarged perspective view of a light emitting device, partially broken away.

The light emitting devices 6 and 7 are made up of light-emitting sections 56, 57 including plural light emitting elements (LEDs), for example, and light fiber bundles 8 and 9 conducting the light beams emitted by these LEDs, as shown in FIGS. 2 and 8. Each of the light emitting sections 56 and 57 is so arranged that each LED is associated with the proximal surface of each of plural optical fibers 45 making up each of the optical fiber bundles 8 and 9. In the light emitting devices 6 and 7, each of the optical fiber bundles 8 and 9 has its terminal portion supported by a supporting member so that the optical fibers 45 are arrayed in a row. The light beam emitted via the terminal portion of each optical fiber 45 is radiated forwardly of the supporting member via a slit 55 formed in the supporting member. Thus the light emitting devices 6 and 7 are designed for selectively illuminating the LEDs of each of the light emitting sections 56, 57 for indicating certain information at the terminal portions of the optical fiber bundles 8 and 9 in the form of a particular array of light points.

The light emitting elements of the light emitting sections 56, 57 may for example be 128 LEDs, of which 88 are employed for recording digital audio signals. That is, in the first digital sound track area 129, digital signals are recorded, with the maximum number of the dots in the transverse direction of the motion picture film 103 being 88. In the first digital sound track area 129, four channels, that is first to fourth channels, of digital audio signals are recorded. In the second digital sound track area 130, digital signals are similarly recorded, with the maximum number of the dots in the transverse direction of the motion picture film 103 being 88. In the second digital sound track area 130, four channels, that is fifth to eighth channels, of digital audio signals are recorded.

The light emission by the light emitting sections 58, 57 is controlled by a LED driver 51, as shown in FIG. 2. The LED driver 51 is fed with digital audio signals. These digital audio signals are the analog audio signals entering an input terminal for the analog audio signals (Analog IN) and converted by an A/D converter 48 into digital signals which are then compressed by a signal compressor or encoder 49 and delayed a pre-set time by a delay circuit 50 as signal delay means. The signal compressor 49 may also be fed with digital audio signals via an input terminal for digital audio signals (Digital IN).

The A/D converter 48, signal compressor 49, delay circuit 50 and the LED driver 51 are fed with clocks generated by a clock generator 52, and are operated at the timings based on these clock signals. The clock generator 52 generates the clock signals based upon synchronization signals supplied thereto. The synchronization signals and the clock signals are fed to a motor driver 53 which, based upon these synchronization signals and the clock signals, controls the rotational speed of a driving motor rotationally driving the feed drum 117 of the analog audio signal recording unit 102, that is the feed rate of the motion picture film 103.

The delay caused in the digital audio signals by the delay circuit 50 is the time required for the motion picture film 103 to be moved from the site of recording of the analog audio signals by the analog audio signal recording unit 102, that is the position facing the projection lens 123 on the feed drum 117, as far as the site of recording of the digital audio signals by the digital recording unit 2, that is the position facing the first or second projection lens 4 or 5 on the drum 11, and the time required for digitalization and compression of the analog audio signals by the A/D converter 48 and the signal compressor 49. Thus the left and right channels (L and R channels) of the analog audio signals and the channels of the digital audio signals (first to fourth channels and fifth to eighth channels) are recorded in synchronism and in register with the frames of the motion picture film 103. That is, in the present digital audio signal recording unit, the analog audio signals and the digital audio signals, derived from the same sound source, are recorded in register with the same relevant frame on the motion picture film 103.

The analog audio signals entering the input terminal for the analog audio signals are also fed to the light bulb via the light bulb controller 125.

The audio signal recording system for the motion picture film may be constituted using the above-described digital audio signal recording unit 1, film magazine 101 and the analog audio signal recording unit 102, a shown in FIG. 2.

With the present audio signal recording system for the motion picture film, the motion picture film 103 is reeled out from a supply reel 104 in the film magazine 101 as indicated by arrow S in FIG. 1. The film thus reeled out is passed through the inside of the outer casing 3 of the recording unit 1 and reaches the inside of the outer casing 113 of the analog audio signal recording unit 102. Analog audio signals are recorded in the analog sound track area 127 of the motion picture film 103 by the analog audio signal recording unit 102 so that the analog sound track is formed. The motion picture film 103, on which the analog sound track has been formed, is fed to the digital audio signal recording unit 1 where digital audio signals are recorded in the digital sound track areas 129,130 of the motion picture film 103 so that the digital sound tracks are now formed. The motion picture film 103, on which the digital sound tracks have now been formed, is taken up by the take-up reel 105 in the film magazine 101, as indicated by arrow T in FIG. 1.

The digital audio signal recording unit and the audio signal recording system for the motion picture film according to the present invention is not limited to the above-described embodiment in which the digital sound tracks are formed only in the digital sound track areas 129, 130 on both sides of the motion picture film 103. Thus the digital audio signals may be recorded in the areas defined between the neighboring frames 128 so that these areas also serve as the digital sound tracks. The digital audio signal recording unit and the audio signal recording system for the motion picture film may also be so designed that digital audio signals are recorded only in the areas defined between the neighboring frames 128 so that the digital sound tracks are formed only in these areas.

In addition, in the digital audio signal recording unit and the audio signal recording system for the motion picture film according to the present invention, the number of channels of the digital audio signals recorded in the digital sound track areas 129, 180 may be increased as compared with that in the above-described embodiment by increasing the signal compression ratio in the signal compressor 49. Conversely, if the smaller number of the channels of the digital audio signals recorded in the digital sound track areas 129, 180 suffices, the ratio of signal compression by the signal compressor 49 may be diminished, or the signal compressor 49 may be dispensed with. In these cases, it is unnecessary for the same number of channels of the digital audio signals to be recorded in the digital sound track areas 129,130, that is, different numbers of channels of the digital audio signals may be recorded in the digital sound track areas 129, 130.

What is claimed is:

1. A device for recording digital audio signals for a motion picture film in which the digital audio signals are recorded on the travelling motion picture film reeled out from a film magazine, comprising a first film feed-in section provided at a position in register with a film feed, out section adapted for feeding out the motion picture film loaded in the film magazine, a digital audio signal recording section for recording the digital audio signals in digital sound track areas on said motion picture film, a first film feed out section provided at a position in register with a film lead-in portion of an analog audio signal recording device adapted for recording analog audio signals in an analog sound track area on said motion picture film, a second film feed-in section provided in register with a film lead-out section of the analog audio signal recording device, and a second film feed-out section provided at a position in register with a film taker-in section re-introducing the motion picture film into the film magazine.

2. The digital audio signal recording device as claimed in claim 1 wherein the digital audio signal recording device is provided between the film magazine having the motion picture film loaded thereon and the analog audio signal recording device.

3. The digital audio signal recording device as claimed in claim 2 wherein the digital audio signal recording is made on the motion picture film which, reeled out from the film magazine and passed through the digital audio signal recording device, is transported to the analog audio signal recording device for recording analog audio signals thereon and subsequently again transported to the digital audio signal recording device.

4. The digital audio signal recording device as claimed in claim 3 further comprising signal delay means for delaying the digital audio signals by the time required for the motion picture film to be moved from the site of recording of the analog audio signals by the analog audio signal recording device as far as the site of recording of the digital audio signals by the digital recording section and the time required for digital processing by the digital recording means.

5. An audio signal recording system for a motion picture film in which both analog audio signals and digital audio signals may be recorded on a travelling motion picture film fed from a film magazine and returned back into the film magazine, comprising the film magazine having loaded thereon the motion picture film capable of recording both the analog audio signals and the digital audio signals, an analog audio signal recording device having analog audio signal recording means for recording analog audio signals in an analog audio signal recording area of the travelling motion picture film fed out from the film magazine, and a digital audio signal recording device having a first film feed-in section provided at a position in register with a film feed-out section adapted for feeding out the motion picture film loaded in the film magazine, a digital audio signal recording section for recording the digital audio signals in digital sound track areas on said motion picture film, a first film feed-out section provided at a position in register with a film lead-in portion of an analog audio signal recording device adapted for recording analog audio signals in an analog sound track area on said motion picture film, a second film feed-in section provided in register with a film lead-out section of the analog audio signal recording device, and a second film feed-out section provided at a position in register with a film taker-in section re-introducing the motion picture film into the film magazine.

6. The audio signal recording system as claimed in claim 5 wherein said digital audio signal recording device is arranged between the film magazine having the motion picture film loaded thereon and said analog audio signal recording device, the motion picture film loaded on the film magazine is fed out from the film reel-out section into the digital audio signal recording device via the first film feed-in section, transferred via the first film feed-out section into the film lead-in section in the analog audio signal recording device and thence returned into the digital audio signal recording device via the film lead-out section and the second film feed-in section in the analog audio signal recording device, digital audio signals are recorded in the digital sound track area by the digital audio signal recording means when the motion picture film is returned back into the digital audio signal recording device, and the motion picture film is transferred via the second film feed-out section in the digital audio signal recording device into the film taker-in section in the film magazine so as to be taken up therein.

7. The audio signal recording system as claimed in claim 5 further comprising signal delay means for delaying the digital audio signals by the time required for the motion picture film to be moved from the site of recording of the analog audio signals by the analog audio signal recording device as far as the site of recording of the digital audio signals by the digital recording section and the time required for digital processing by the digital recording means.

\* \* \* \* \*

UNITED STATES PATENT AND TRADEMARK OFFICE
CERTIFICATE OF CORRECTION

PATENT NO. : 5,485,232
DATED : January 16, 1996
INVENTOR(S) : Saito et al.

It is certified that error appears in the above-identified patent and that said Letters Patent is hereby corrected as shown below:

Change:

Assignee: "Sony Corporation, Tokyo, Japan" to

-- Sony Cinema Products Corporation, Culver City, California --.

Signed and Sealed this

Eighteenth Day of June, 1996

Attest:

BRUCE LEHMAN

*Attesting Officer*       *Commissioner of Patents and Trademarks*